United States Patent [19]

Chan

[11] Patent Number: 5,329,759
[45] Date of Patent: Jul. 19, 1994

[54] METHOD FOR REGULATING FUEL FLOW IN A GAS TURBINE ENGINE

[75] Inventor: Hing C. Chan, Mississauga, Canada

[73] Assignee: Pratt & Whitney Canada, Inc., Lonqueil, Canada

[21] Appl. No.: 85,514

[22] Filed: Jun. 30, 1993

[51] Int. Cl.$^5$ ............................................. F02C 7/26
[52] U.S. Cl. .................................. 60/39.06; 60/39.141; 60/746
[58] Field of Search ............. 60/39.06, 39.141, 39.281, 60/734, 739, 740, 746, 747

[56] References Cited

U.S. PATENT DOCUMENTS

| | | | |
|---|---|---|---|
| 4,711,085 | 12/1987 | Lyons | 60/39.141 |
| 4,817,389 | 4/1989 | Holladay et al. | 60/739 |
| 4,903,478 | 2/1990 | Seto et al. | 60/746 |
| 4,920,740 | 5/1990 | Shekleton | 60/39.141 |
| 5,165,223 | 11/1992 | Ingham et al. | 60/39.06 |
| 5,261,222 | 11/1993 | Napoli | 60/39.141 |

Primary Examiner—Louis J. Casaregola
Attorney, Agent, or Firm—James M. Rashid

[57] ABSTRACT

Fuel flow to the combustor of a gas turbine engine is regulated by controlling the amount of fuel delivered to the primary and secondary fuel orifices of a hybrid fuel nozzle. A one-way valve extending between primary and secondary fuel manifolds is controlled by an electronic sensor that acts upon signals received from sensors at station 4.5 of the engine, and by sensors that measure engine speed. By opening and closing the valve based upon $T_{4.5}$ and $N_2$ speed, optimum engine operating conditions are achieved.

9 Claims, 2 Drawing Sheets

METHOD FOR REGULATING FUEL FLOW IN A GAS TURBINE ENGINE

DESCRIPTION

Technical Field

This invention relates to gas turbine engines, and in particular, to a method for regulating fuel flow to the combustor of a gas turbine engine.

Background Art

Gas turbine engines are widely used to power aircraft throughout the world. The engine provides thrust which powers the aircraft by burning a mixture of fuel and air in one or more combustors. A set of circumferentially arrayed fuel nozzles spray such mixture into each combustor in a form suitable for rapid mixing and efficient combustion.

Fuel nozzles must be able to (a) efficiently atomize fuel at low air flow rates, (b) uniformly atomize fuel at high power regimes, and (c) provide predictable and controllable fuel spray characteristics over a range of engine operating conditions.

In many gas turbine engines, electronic controls are utilized to measure various engine operating parameters and to cause the engine to appropriately respond to such parameters. The use of such electronic engine controls have substantially improved the efficiency of gas turbine engines, as well as increased their safety and durability.

Notwithstanding the use of electronic devices to sense and control engine operating characteristics, some difficulties still exist. For example, the severe conditions at which the combustion process takes place causes extreme strain on certain components in the combustor and turbine sections of the engine. In particular, certain turbine vanes experience significant degradation, which is attributed to the conditions associated with engine start up. This degradation is believed due to the use of specially designed fuel nozzles that are arranged about the circumference of the combustor. These nozzles, sometimes referred to as hybrid nozzles, flow great amounts of fuel into the combustor during engine start up. The combustion of this fuel causes extraordinary stress on the turbine vanes located immediately downstream of the hybrid nozzles. Accordingly, engineers have sought to improve the combustion process so that operators of gas turbine engines can avoid the costly replacement of damaged turbine section hardware.

SUMMARY OF THE INVENTION

According to this invention, a method for regulating fuel flow to the combustor of a gas turbine engine, wherein the fuel flows through a hybrid fuel nozzle into the combustor and the nozzle has a primary and secondary orifice, comprises: a first fuel flow regime during which fuel flows to the primary orifice at a pressure between approximately 250 and 300 psi and to the secondary orifice at a pressure between about 1 and 5 psi; a second fuel flow regime during which fuel flows to both the primary and secondary orifices at a pressure between approximately 5 and 30 psi; and a third fuel flow regime during which fuel flows to the primary orifice at a pressure between about 250 and 300 psi and to the secondary orifice at a pressure consistent with engine operation in excess of 50% $N_2$ speed. The first flow regime is operational between the initiation of engine start up and the attainment of stable fuel combustion in the combustor; the second fuel flow regime is operational between the attainment of sustainable combustion conditions and approximately 50% $N_2$ speed; and the third flow regime is operational thereafter.

In a preferred embodiment of the invention, thermocouple temperature sensors measure the temperature at station 4.5 of the engine. When that temperature, commonly referred to as the $T_{4.5}$ temperature, reaches approximately 300°±25° C., an electronically controlled valve closes off the flow of high pressure fuel (i.e., 250–300 psi fuel) to the primary orifice. Experience has shown that a $T_{4.5}$ temperature of approximately 300° C. is sufficiently high to attain stable combustion conditions. Shutting off the flow of high pressure fuel to the primary orifice reduces the likelihood that damage to downstream turbine hardware will occur. Fuel continues to flow to the secondary orifice at gradually increasing pressures which range from approximately 5 to 40 psi; fuel is also shunted to the primary orifice at the same gradually increasing pressure between about 5 to 40 psi until the engine reaches about 50% $N_2$ speed. Once such $N_2$ speed is achieved, sufficient air is flowing through the engine and through the combustor so that fuel pressure to the primary orifice can be increased back up to the 250–300 psi range, and up to as high as 800 psi through the secondary orifice without causing undue degradation of downstream turbine engine hardware. At such fuel pressures, the engine is capable of operating at speeds in excess of 50% $N_2$ speed as the aircraft performs take-off, climb, and cruise. The third fuel flow regime is operational until the aircraft lands at base, and engine speed is brought back to ground idle speed.

Other advantages and features of the invention will be apparent by referring to the figures and best mode for carrying out the invention, as described below.

BRIEF DESCRIPTION FOR CARRYING OUT THE INVENTION

Figure 1:
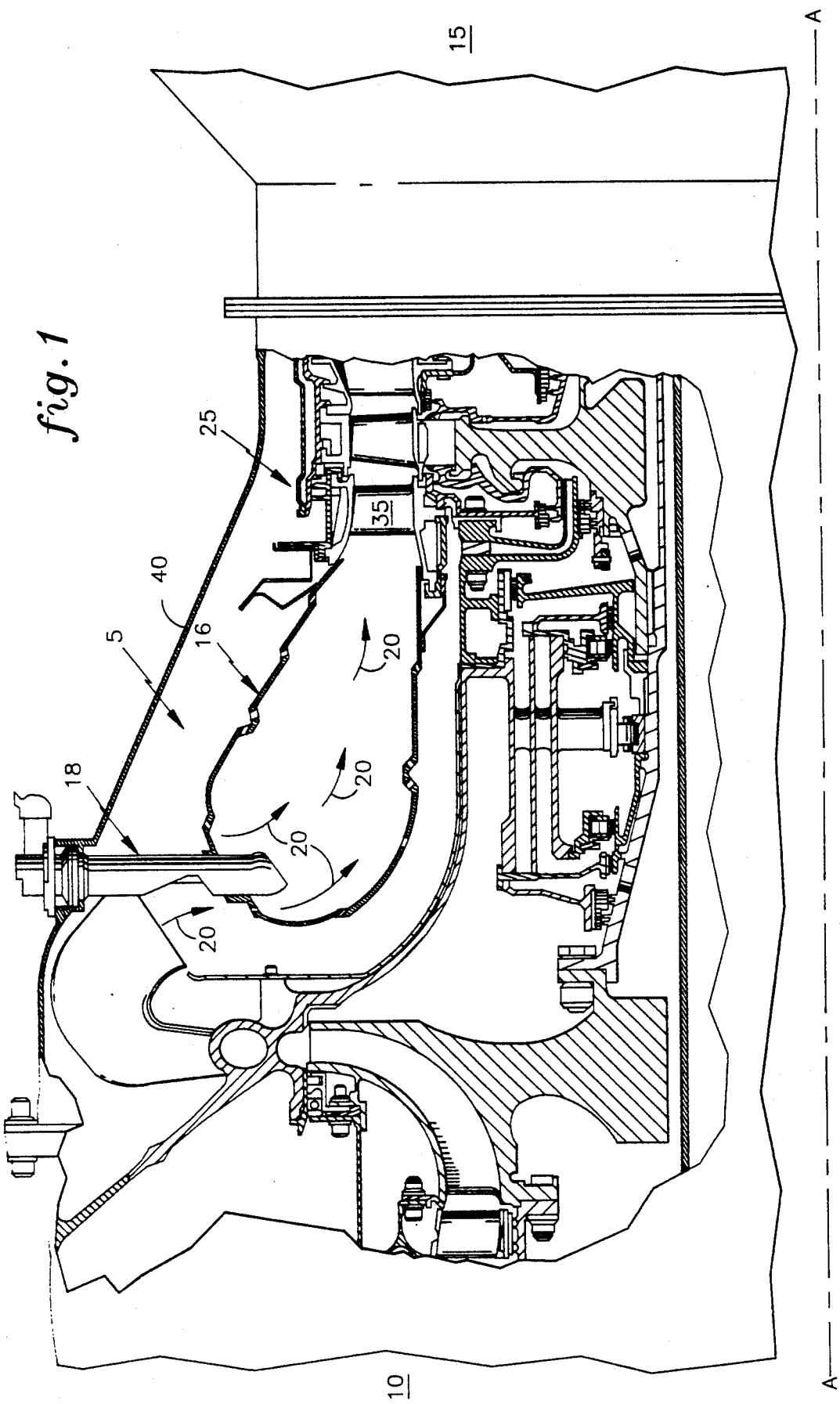
FIG. 1 is a simplified, cross-sectional view of a gas turbine engine, partially cut away to show the combustion and turbine sections of the engine.

FIG. 1 is a simplified, cross sectional view showing the combustor section 5 of a conventional gas turbine engine. The axis of the engine is indicated by the reference numeral A—A. The upstream end of the engine is indicated by the reference numeral 10 and the downstream end of the engine is indicated by the reference numeral 15. The key features of the combustor section 5 are the combustor 16 and the fuel nozzle 18. During operation of the engine, air and fuel flow through the nozzle 18 and into the combustor 16 in the direction generally indicated by arrows 20, and then pass into the turbine section 25 of the engine. The fuel and air mixture is ignited during engine start-up by an ignitor (not shown) which is proximate to the nozzle 18. The first stage of the turbine section 25 begins with a row of circumferentially spaced apart turbine vanes 35. In general, the outer boundary of the combustor 5 is defined by the combustor duct 40. The combustor 16 has an annular shape, and the fuel nozzles 18 are circumferentially spaced about the combustor 16. At least one of the fuel nozzles is of the hybrid type, that is, it has a primary and secondary fuel orifice fed by a primary and secondary manifold, respectively.

During operation of the engine, fuel flow to the hybrid nozzle is regulated by an electronic engine control, which is responsive to input signals received from electronic sensors arranged about the engine. These signals include a measurement of the interturbine temperature at station 4.5 of the engine, sometimes referred to as $T_{4.5}$; and the high pressure compressor speed, referred to as $N_2$. According to this invention, optimum engine operating conditions are met by flowing fuel to the hybrid nozzle in three regimes. In the first regime, fuel flows to the primary orifice of the hybrid nozzle at a fuel pressure between about 250 and 300 psi; at the same time, fuel flows to the secondary orifice at a gradually increasing fuel pressure between about 1 and 5 psi. The first fuel flow regime operates between the time engine start up is initiated to the time that the engine achieves a state of sustainable fuel combustion. A measure of when fuel combustion has reached a sustainable state is when $T_{4.5}$ reaches about 300°±25° C. An alternate measure is $N_2$ speed in the range of about 11 to 13%. ($N_2$ speed, at any particular point of time during operation of a dual spool gas turbine engine, is typically reported as a percentage of the maximum rotational speed of the high spool of the engine.)

In the second fuel flow regime, fuel flows to both the primary and secondary orifice at a fuel pressure between approximately 5 and 30 psi; the second fuel flow regime is operational during the time period between achieving a state of stable fuel combustion in the combustor (approximately 300° C. $T_{4.5}$) and the engine achieving approximately 50% $N_2$ speed.

During the third fuel flow regime, fuel flows to the primary orifice at approximately 250 to 300 psi, while at the same time, fuel flows to the secondary orifice at a fuel pressure greater than at least about 30 psi, at a pressure that is consistent with engine operation in excess of 50% $N_2$ speed. The fuel pressure to the secondary orifice during the third fuel flow regime can reach up to about 800 psi for take off conditions, and then decrease to approximately 700 psi during climb, 500 psi during cruise, and then back down to about 30 to 40 psi at ground idle conditions.

Figure 2:
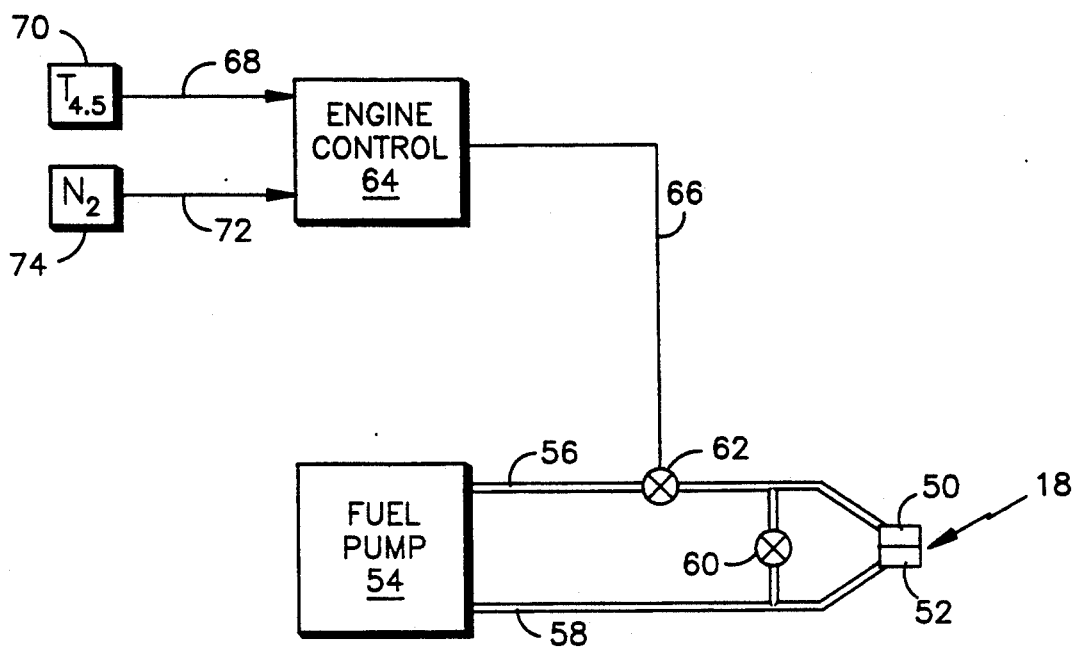
FIG. 2 is a schematic drawing showing features of the invention.
Figure 3:
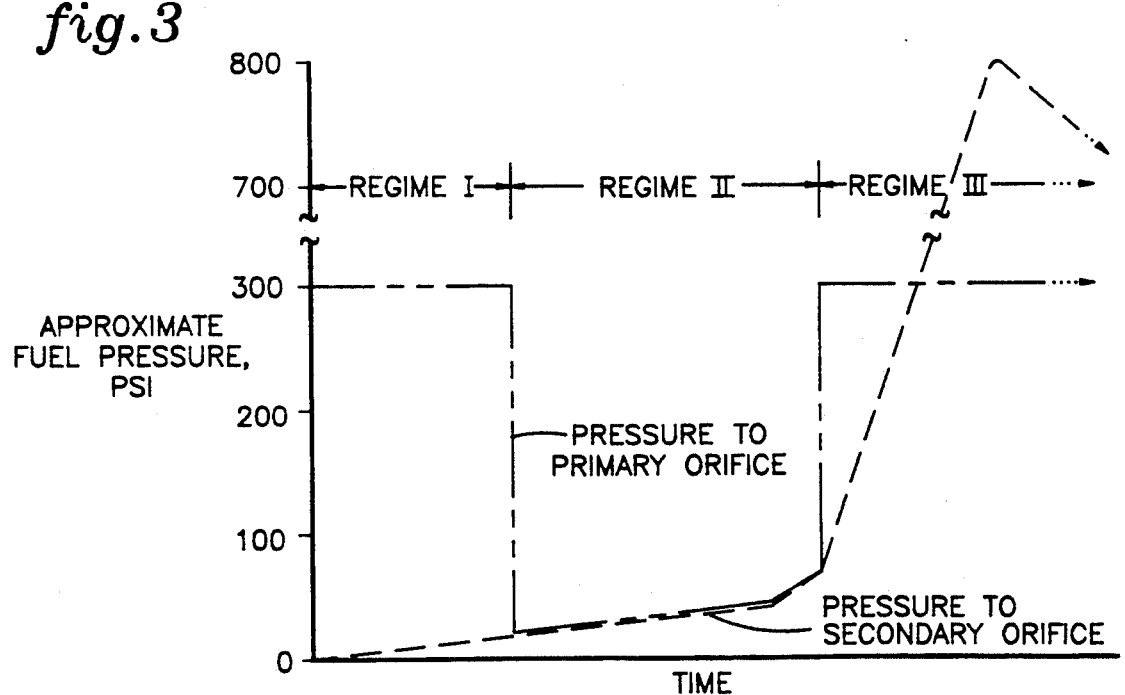
FIG. 3 is a graphical representation showing fuel pressure through the primary and secondary nozzle orifices as a function of time.

Reference is directed to FIG. 3 which graphically shows the relationship between fuel pressure through the primary and secondary orifice as a function of time of engine operation. FIG. 3 shows fuel pressure through the primary and secondary orifice are independent of each other, except during Regime II. Means for achieving the fuel regimes corresponding to FIG. 3 are schematically presented in FIG. 2. Referring to FIG. 2, primary and secondary nozzle orifices 50 and 52, respectively, feed fuel nozzle 18. Fuel is delivered to the orifices 50, 52 by a conventional hydromechanical unit/fuel pump 54. The pump 54 feeds the primary orifice through primary line manifold 56; it feeds the secondary orifice 52 through secondary line manifold 58. Fuel line manifold 60 connects the primary and secondary lines 56 and 58 downstream of solenoid activated valve 62. The valve 62 is a one-way valve, and functions in response to signals sent by engine control 64 through harness 66. The engine control 64 acts in response to signals received from the $T_{4.5}$ sensor 70 and $N_2$ sensor 74. $T_{4.5}$ signals are sent to control 64 through connecting harness 68; similarly, signals from $N_2$ sensor 74 are sent to engine control 64 through harness 72.

During Regime I, engine control 64 de-energizes the solenoid valve 62, thereby opening the valve. Fuel flowing through the primary line 56 at between about 250 and 300 psi is delivered to primary orifice 50. Fuel is delivered to secondary orifice 52 through secondary line 58 at fuel pressures between approximately 1 and 5 psi. When $T_{4.5}$ reaches approximately 300° C., the solenoid 62 is energized, thereby closing the primary line upstream of one way valve 60. Accordingly, no fuel flows from the pump 54 through the primary fuel manifold 56 upstream of the valve 60. Fuel continues to flow to the secondary line at a pressure no less than about 5 psi, and increases up to about 30 psi as the engine accelerates. The fuel flows to the secondary orifice 52, and through the one-way valve 60 to the primary orifice 50. Regime II fuel flow continues until the engine nearly reaches ground idle speed, or approximately 50% $N_2$ speed. As the engine control senses that ground idle speed is about to be achieved, the solenoid valve 62 is de-energized. This opens the valve 62, which allows the 250 to 300 psi fuel to flow through the primary line 56 to the primary orifice 50. As the aircraft speed increases above ground idle speed, fuel pressure is increased to the secondary line 58, and higher pressure fuel is delivered to the secondary orifice 52. Fuel pressures to the secondary orifice 52 can range up to about 800 psi for takeoff conditions, and then decrease to about 700 psi for climb, 500 psi for cruise and back down to about 30 to 40 psi after the aircraft lands and the engine returns to ground idle speed.

In the event of an in-flight, unscheduled engine shutdown, the engine control immediately returns to Regime I which allows for quick and efficient engine starting. Once the engine is started, the engine control returns the engine to, in sequence, Regime II and Regime III.

Use of the invention allows for safe and reliable engine starting conditions. Excessive degradation of turbine section hardware is prevented by shutting off the high pressure fuel flow to the primary orifice once stable combustion conditions are achieved; thereafter fuel pressure is increased gradually, and as air flow through the engine increases because of increasing $N_2$ speed, the likelihood of hot spots on turbine section hardware is minimized.

A further advantage of the invention is that engine start time is reduced nearly 50%, in some engines, from approximately 60 seconds to 30 seconds. This is made possible because the invention allows the use of more aggressive fuel flow schedules during Regime I and Regime II operations. In particular, the rate of fuel flow to the combustor section can be nearly doubled, which accounts for the nearly 50% reduction in engine start time without fear that local hot spots will damage the turbine vane hardware.

Although the invention has been shown and described with respect to a particular embodiment thereof, it should be understood by those skilled in the art that the foregoing and various other changes, omissions, and additions in the form and detail thereof may be made therein without departing from the spirit and scope of the invention.

I claim:

1. A method for regulating fuel flow to the combustor of a gas turbine engine, wherein the fuel flows through a hybrid fuel nozzle into the combustor and the nozzle has a primary and secondary orifice, comprises: a first fuel flow regime during which fuel flows to the primary orifice at a pressure between about 250 and 300 psi and to the secondary orifice at a pressure between about 1 and 5 psi; a second fuel flow regime during which fuel flows to both the primary and secondary orifices at a pressure between about 5 and 30 psi; and a third fuel flow regime during which fuel flows to the primary orifice at a pressure between about 250 and 300 psi and to the secondary orifice at a pressure consistent with engine operation in excess of 50% $N_2$ speed, wherein the first flow regime is operational between the initiation of engine start up and the attainment of stable fuel combustion in the combustor; the second fuel flow regime is operation between the attainment of stable combustion conditions and approximately 50% $N_2$ speed; and the third flow regime is operational thereafter.

2. The method of claim 1, including the step of measuring the temperature at station 4.5 of the engine, and terminating the flow of 250 to 300 psi fuel to the primary orifice during the first flow regime when such temperature is between about 275° and 325° C.

3. The method of claim 1, including the step of measuring the $N_2$ speed of the engine, and terminating the flow of 250 to 300 psi fuel to the primary orifice during the first flow regime when such $N_2$ speed is between about 11 and 13%.

4. The method of claim 1, wherein the first fuel flow regime includes the step of flowing fuel from a fuel pump to the primary fuel orifice through a primary fuel manifold, and flowing fuel from a fuel pump to the secondary fuel orifice through a secondary fuel manifold.

5. The method of claim 4 wherein the second fuel flow regime includes the step of flowing fuel from the secondary fuel manifold to the primary fuel manifold through a one-way valve extending therebetween, such that no fuel flows from the pump through the primary fuel manifold upstream of the valve.

6. The method of claim 1, wherein the third fuel flow regime includes the step of flowing fuel from a fuel pump to the primary fuel orifice through a primary fuel manifold, and flowing fuel from a fuel pump to the secondary fuel orifice through a secondary fuel manifold.

7. The method of claim 5, including the step of opening the valve at the beginning of the second fuel flow regime, and closing the valve at the end of the second fuel flow regime.

8. The method of claim 7, wherein the step of opening the valve comprises energizing a solenoid, and the step of closing the valve comprises de-energizing the solenoid.

9. A method for regulating fuel flow to the combustor of a gas turbine engine, wherein fuel flows from a fuel pump through a hybrid fuel nozzle into the combustor, the nozzle having a primary orifice and a secondary orifice, and fuel flows from the pump to the primary orifice through a primary fuel manifold, and from the pump to the secondary orifice through a secondary manifold, the method comprising the steps of: flowing fuel to the combustor during a first fuel flow regime wherein fuel flows from the pump through the primary manifold and to the primary orifice at a pressure between about 250 and 300 psi, and from the pump through the secondary manifold to the secondary orifice at a pressure between about 1 and 5 psi; measuring the temperature at station 4.5 of the engine, and terminating the flow of 250 to 300 psi fuel from the pump through the primary manifold and to the primary orifice when such temperature is between about 275° and 325° C.; flowing fuel to the combustor during a second fuel flow regime wherein fuel flows from the pump to both the primary and secondary orifices at a pressure between about 5 and 30 psi, wherein the second fuel flow regime includes the step of flowing fuel from the pump through the secondary fuel manifold and then to the primary fuel manifold through a one-way valve extending therebetween, such that no fuel flows from the pump through the primary fuel manifold upstream of the valve; and a third fuel flow regime during which fuel flows from the pump through the primary manifold and to the primary orifice at a pressure between about 250 and 300 psi, and from the pump through the secondary manifold and to the secondary orifice at a pressure consistent with engine operation in excess of 50% $N_2$ speed, wherein the third flow regime is operational after the second flow regime and until the engine speed is reduced approximately to ground idle speed.

* * * * *